United States Patent
Hironimus et al.

(10) Patent No.: US 7,418,811 B2
(45) Date of Patent: Sep. 2, 2008

(54) MID MOUNT RAKES AND PICKUP WITH SIDE DELIVERY SWATHERS

(75) Inventors: Jeannot Hironimus, Schwebwiller (FR); Olivier Stutzmann, Zilling (FR)

(73) Assignee: Kuhn S.A., Saverne (FR)

( * ) Notice: Subject to any disclaimer, the term of this patent is extended or adjusted under 35 U.S.C. 154(b) by 164 days.

(21) Appl. No.: 10/501,345

(22) PCT Filed: Feb. 6, 2003

(86) PCT No.: PCT/FR03/00372

§ 371 (c)(1),
(2), (4) Date: Jul. 26, 2004

(87) PCT Pub. No.: WO03/067960

PCT Pub. Date: Aug. 21, 2003

(65) Prior Publication Data

US 2005/0126153 A1      Jun. 16, 2005

(30) Foreign Application Priority Data

Feb. 12, 2002   (FR)   .................................. 02 01850

(51) Int. Cl.
*A01D 43/02*   (2006.01)
*A01D 87/04*   (2006.01)

(52) U.S. Cl. ...................................................... 56/354

(58) Field of Classification Search ........... 56/350–353, 56/366, 370, 363, 364, 367, 368, 354
See application file for complete search history.

(56) References Cited

U.S. PATENT DOCUMENTS

| | | | | |
|---|---|---|---|---|
| 2,168,266 A |   | 8/1939 | McElwain | |
| 2,811,003 A | * | 10/1957 | Getz | 56/1 |
| 3,141,284 A | * | 7/1964 | Reynolds | 56/354 |
| 3,343,347 A | * | 9/1967 | Burrough et al. | 56/11.2 |
| 3,570,231 A | * | 3/1971 | McCary | 56/370 |
| 3,650,096 A | * | 3/1972 | Caldwell | 56/7 |
| 3,714,766 A | * | 2/1973 | Ender et al. | 56/364 |
| 3,948,028 A | * | 4/1976 | Reber | 56/365 |
| 4,185,445 A | * | 1/1980 | van der Lely | 56/6 |
| 4,203,277 A | * | 5/1980 | Kaetzel | 56/377 |
| 4,693,065 A | * | 9/1987 | Aron et al. | 56/377 |
| 4,715,172 A | * | 12/1987 | Mosby | 56/228 |
| 4,738,092 A | * | 4/1988 | Jennings | 56/372 |
| 4,748,803 A | * | 6/1988 | MacMaster et al. | 56/372 |

(Continued)

FOREIGN PATENT DOCUMENTS

FR        2 663 189        12/1991

(Continued)

OTHER PUBLICATIONS

U.S. Appl. No. 11/341,454, filed Jan. 30, 2006, Hironimus.

*Primary Examiner*—Árpád Fábián-Kovács
(74) *Attorney, Agent, or Firm*—Oblon, Spivak, McClelland, Maier & Neustadt, P.C.

(57) ABSTRACT

An agricultural machine for grouping products lying on the ground and in particular having a main frame carrying two gathering devices situated one beside the other during work and to which swathing devices are associated and having a separation device situated in front of the inner ends adjacent to the gathering devices.

28 Claims, 4 Drawing Sheets

U.S. PATENT DOCUMENTS

| | | | |
|---|---|---|---|
| 4,785,614 A * | 11/1988 | Schoenherr | 56/365 |
| 4,793,125 A * | 12/1988 | Ehrhart et al. | 56/16.1 |
| 4,793,129 A * | 12/1988 | Ehrhart et al. | 56/370 |
| 5,203,154 A * | 4/1993 | Lesher et al. | 56/366 |
| 5,231,826 A * | 8/1993 | Jennings | 56/11.4 |
| 5,272,860 A * | 12/1993 | Baril et al. | 56/366 |
| 5,301,496 A * | 4/1994 | Sudbrack et al. | 56/366 |
| 5,450,717 A * | 9/1995 | Delperdang et al. | 56/366 |
| 5,507,139 A * | 4/1996 | Delperdang et al. | 56/366 |
| 5,598,691 A * | 2/1997 | Peeters | 56/377 |
| 5,685,135 A * | 11/1997 | Menichetti | 56/365 |
| 5,752,375 A * | 5/1998 | Tonutti | 56/365 |
| 5,911,625 A * | 6/1999 | von Allworden | 460/119 |
| 6,125,622 A * | 10/2000 | Brackebusch | 56/367 |
| 6,164,051 A * | 12/2000 | van der Lely et al. | 56/367 |
| 6,205,757 B1 * | 3/2001 | Dow et al. | 56/366 |
| 6,314,710 B1 * | 11/2001 | Tonutti | 56/378 |
| 6,543,212 B2 * | 4/2003 | Tonutti | 56/375 |
| 6,658,828 B2 * | 12/2003 | Franet | 56/7 |
| 6,945,024 B2 * | 9/2005 | Tonutti | 56/377 |
| 2005/0126153 A1 | 6/2005 | Hironimus et al. | |

FOREIGN PATENT DOCUMENTS

| | | |
|---|---|---|
| GB | 2 194 422 | 3/1988 |
| WO | 87 06793 | 11/1987 |

\* cited by examiner

MID MOUNT RAKES AND PICKUP WITH SIDE DELIVERY SWATHERS

BACKGROUND

The present invention relates to an agricultural machine for grouping products such as grass, hay or straw lying on the ground. In particular it has a main frame supporting a first gathering device and a second gathering device which are situated one beside the other during work and to which a first swathing device and a second swathing device are respectively associated.

Said swathing devices receive the products picked up by the gathering devices. They may cooperate to form a central swath laid down between them or to form a lateral swath laid down on one of the sides of the machine. In the latter case, it is possible, by making an outward and a return way with the machine, to group a large quantity of products in the same swath.

A known machine of this kind can be used essentially for picking up products that are already in two swaths in order to group them into one swath of greater volume. Accordingly, the possibilities of use of this machine are relatively restricted.

SUMMARY

The particular aim of the present invention is to propose a machine as described in the introduction and which can also gather across a great width the products that are spread across the whole surface of the ground. This is particularly the case when it involves grass that has been cut and deposited in small swaths or spread out to improve drying.

For this purpose, an important feature of the invention consists in the machine comprising separation means situated in front of the inner ends adjacent to the gathering devices. These means separate the products spread on the ground and clear the strip of land situated between the two gathering devices so that they can move forward.

Said separation means advantageously direct the moved products toward the gathering devices. They thus avoid losses of products between said devices and prevent products becoming catched on or wound around the inner edges and on the carrier wheels of these devices.

According to another feature of the invention, the machine comprises separation means situated in front of the outer ends of the gathering devices. These means clear the strips of land situated at the two ends of the machine. They also further the movements of the gathering devices and increase their working width.

The aforementioned separation means may consist of members such as raking disks or drums.

BRIEF DESCRIPTION OF THE DRAWINGS

Other features and advantages of the invention will emerge from the claims and the description that follows of nonlimiting exemplary embodiments of the invention, with references to the appended drawings in which:

DETAILED DESCRIPTION OF EXEMPLARY EMBODIMENTS

Figure 1:
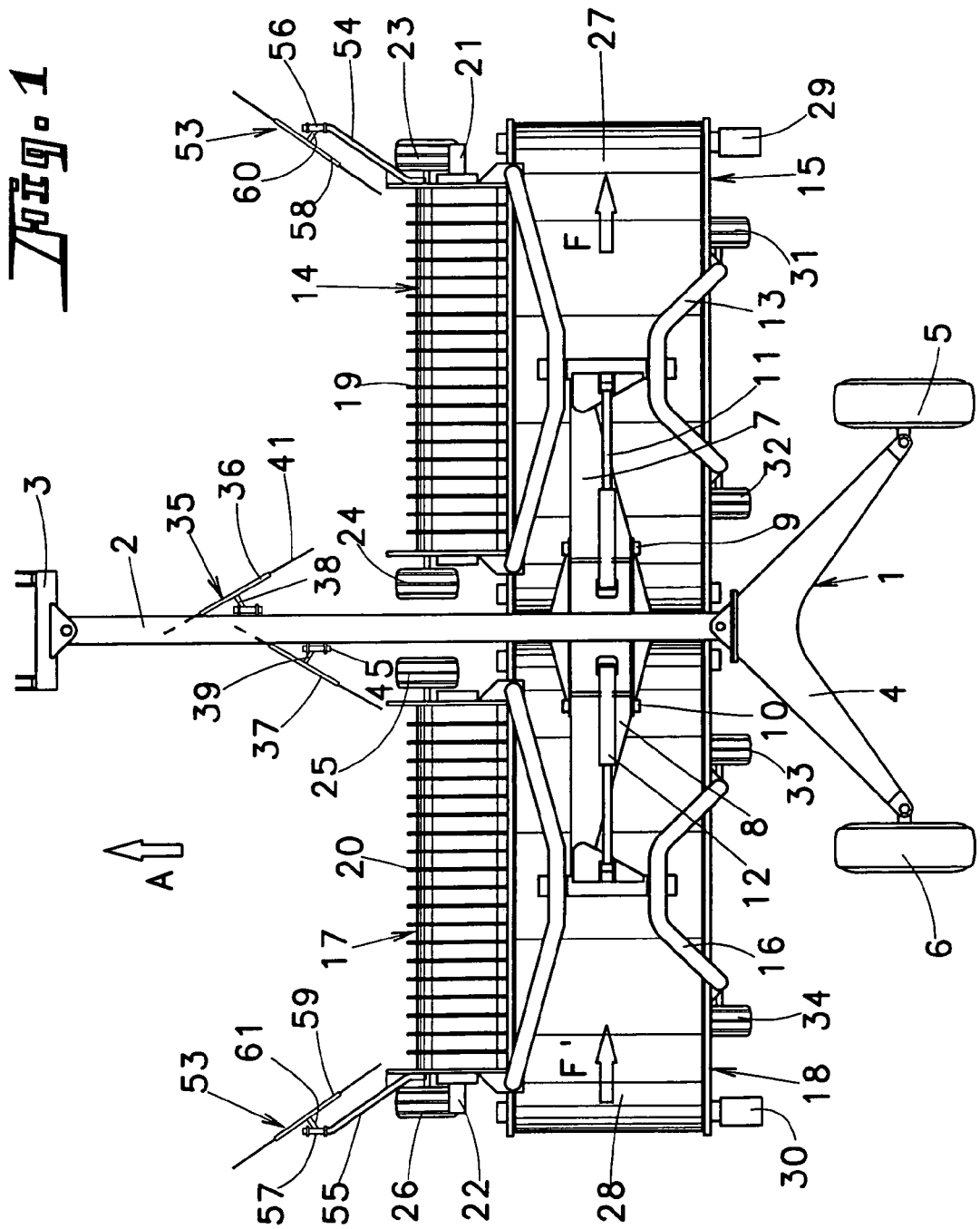
FIG. 1 represents a top view of a first exemplary embodiment of a machine according to the invention.
Figure 2:
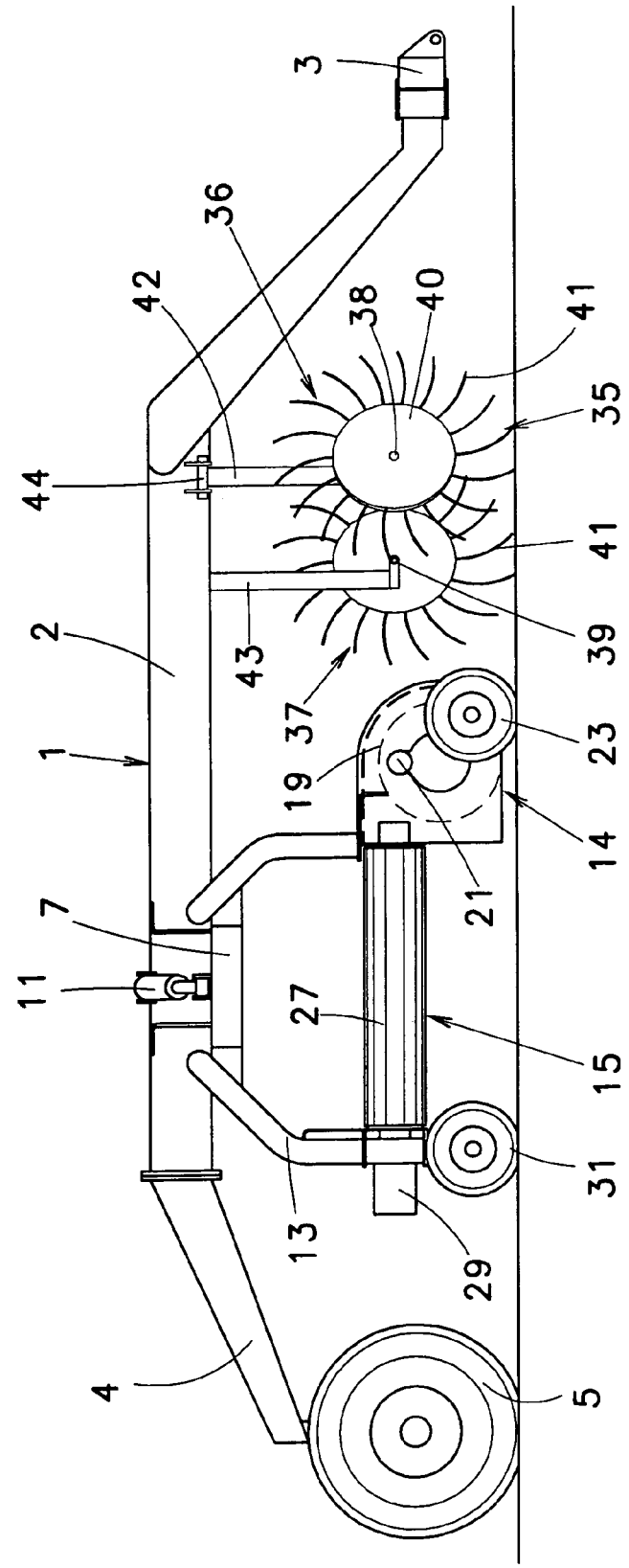
FIG. 2 represents a side view of the machine according to FIG. 1.

As it is represented in FIGS. 1 and 2, the machine according to the invention comprises a main frame (1). The latter consists of a central beam (2) which has at its front end a coupling system (3) for attaching it to a towing tractor and, at its rear end, a cross-beam (4) with two traveling wheels (5 and 6) which rest on the ground. On this beam (2) two arms (7 and 8) are articulated with the aid of axes (9 and 10) which are substantially parallel to the beam (2). These arms (7 and 8) are additionally connected to the beam (2) by means of hydraulic rams (11 and 12) which enable them to move about said axes of articulation (9 and 10).

The first arm (7) extends, when seen in the direction of travel (A), to the right side of the beam (2) and carries a frame (13) to which are connected a first gathering device (14) and a first swathing device (15) which is associated with said first gathering device (14) and is situated immediately behind the latter. The other arm (8) extends to the left side of the beam (2) and carries a frame (16) to which are connected a second gathering device (17) and a second swathing device (18) which is associated with said second gathering device (17) and is situated immediately behind the latter. As can be seen in FIG. 1, in the working position, the two gathering devices (14 and 17) are substantially aligned and are situated at a short distance one from the other. They consist of pick-ups (19 and 20) driven by hydraulic motors (21 and 22) and carried by wheels (23 to 26) which rest on the ground. The swathing devices (15 and 18) consist of conveyor belts (27 and 28). These are driven by hydraulic motors (29 and 30) whose direction of rotation can be reversed. These conveyor belts (27 and 28) can be moved laterally on the frames (13 and 16) in order to change their spacing. These frames (13 and 16) are advantageously articulated on the arms (7 and 8) and in addition have wheels (31 to 34) which rest on the ground.

The beam (2) also carries separation means (35) situated in front of the inner ends adjacent to the gathering devices (14 and 17). These means (35) consist of two raking disks (36 and 37) each of which being able to rotate about an axis (38 and 39) which is substantially horizontal and oblique relative to the direction of travel (A). Each of these raking disks (36 and 37) consists of a circular support (40) fitted with teeth (41) on its entire periphery. They are placed in such a way as to practically form a V whose point is pointing in the direction of travel (A). Their trajectories may however partially overlap in the zone situated under the beam (2). Accordingly, they may be slightly offset from one another in the direction of travel (A) and be placed such that the raking disk (37) that is furthest rearward extends partially behind the other disk (36) (see FIG. 1).

These raking disks (36 and 37) are connected to supports (42 and 43) which are articulated by means of axes (44 and 45) on the beam (2). Said axes of articulation (44 and 45) are substantially horizontal and allow the disks (36 and 37) to move heightwise (see FIG. 2). The latter may then be in contact with the ground and be driven in rotation due to their friction of motion with said ground when the machine is moved in the direction of travel (A).

According to an alternative embodiment not represented, the separation means consist of a single raking disk (36 or 37) of greater diameter which is able to rotate about an axis that is substantially horizontal and oblique to the direction of travel (A).

Figure 3:
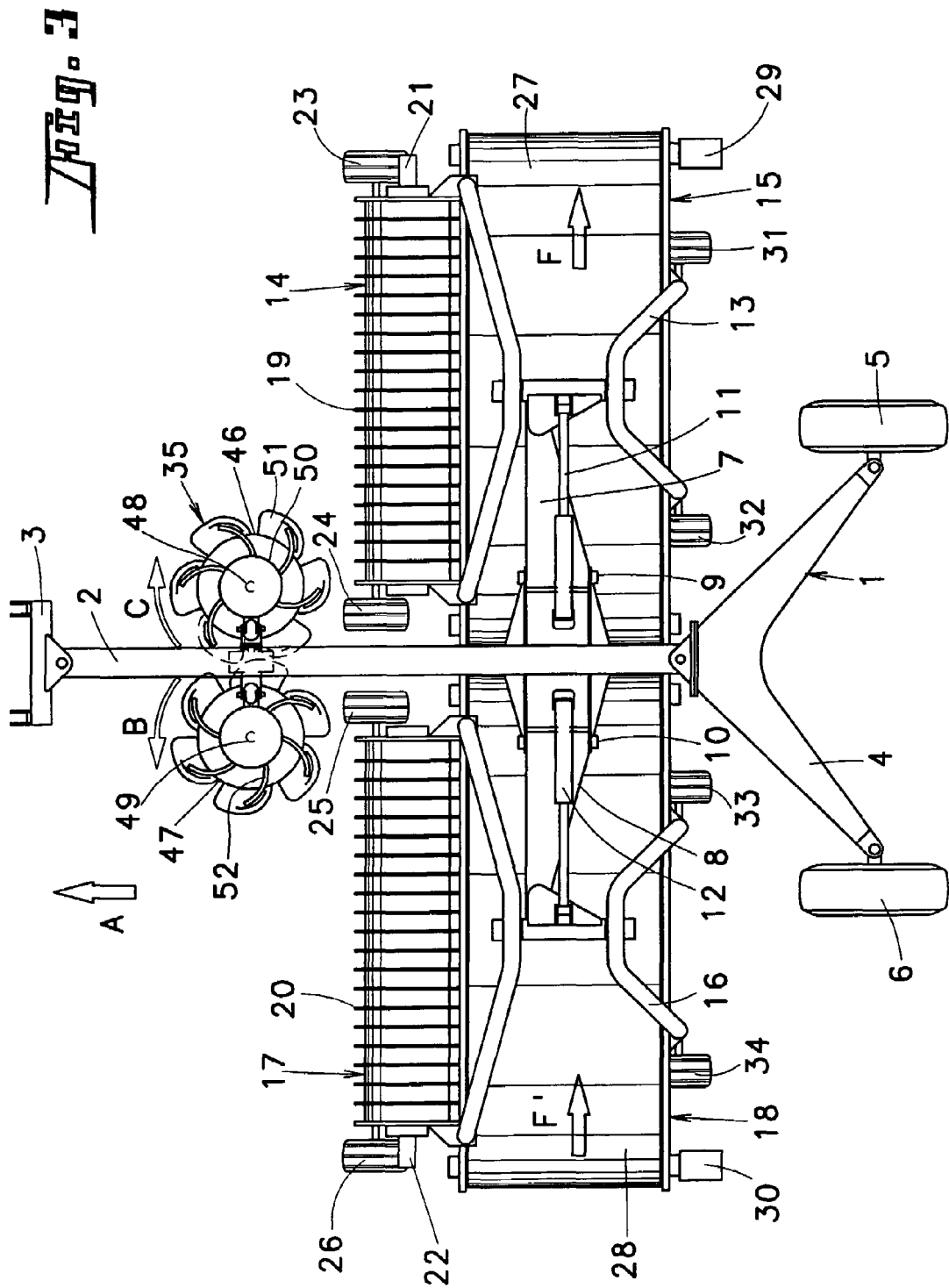
FIG. 3 represents a top view of a second exemplary embodiment of a machine according to the invention.
Figure 4:
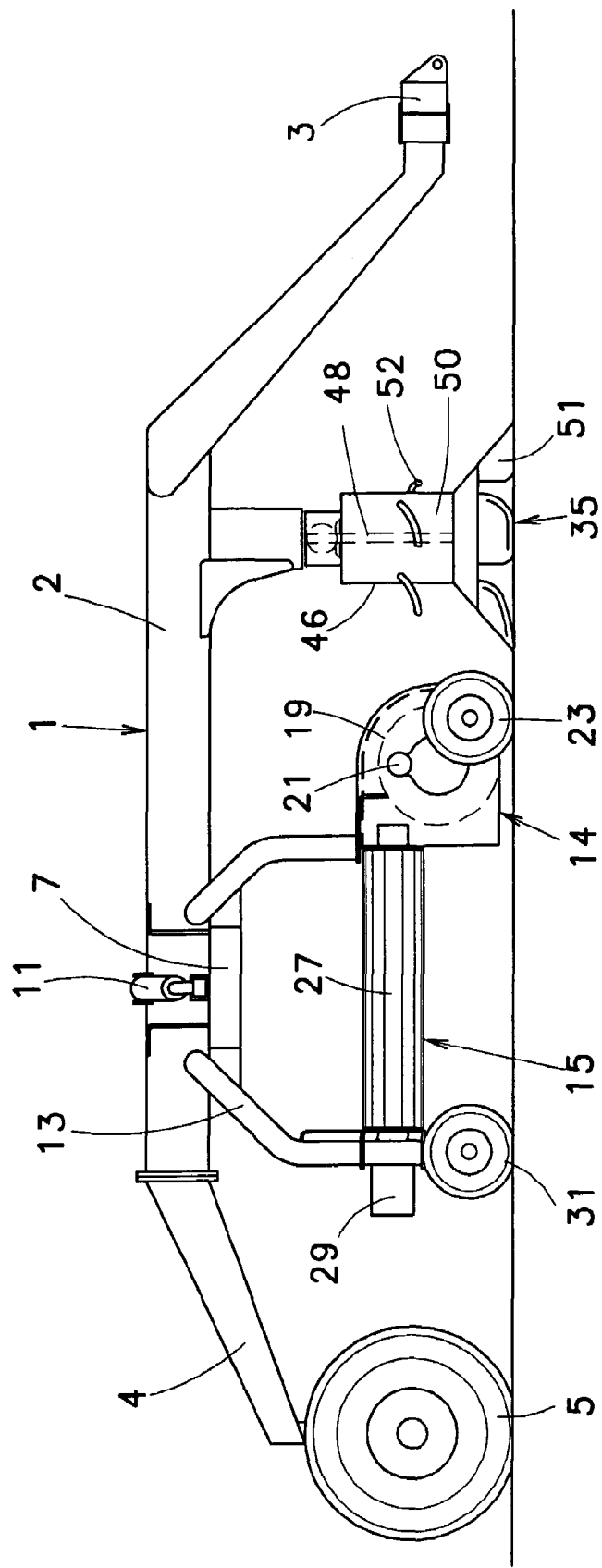
FIG. 4 represents a side view of the machine according to FIG. 3.

In the exemplary embodiment according to FIGS. 3 and 4, the separation means (35) consist of two raking drums (46 and 47) rotating about substantially vertical axes (48 and 49).

These drums (46 and 47) are placed side by side and are connected to the beam (2). They are driven in rotation in such a way as to turn away from one another at the front (arrows B and C) by means of hydraulic motors or transmission shafts which are driven from the power take-off shaft of the tractor.

Each drum (46, 47) is made up of a cylindrical body (50) which carries at its lower part a flexible skirt (51) to pick up and move the products lying on the ground. The cylindrical body (50) of each drum (46, 47) also carries driving elements (52) which are situated above the corresponding flexible skirt (51) and further the movement of the products.

According to an alternative embodiment not represented, the beam (2) carries only one drum (46 or 47) of greater diameter in order to separate the products.

The machine according to the invention may in addition comprise separation means (53) situated in front of the outer ends of the gathering devices (14 and 17). These may involve raking disks or drums complying with those described above. In the example shown in FIG. 1, each gathering device (14, 17) carries at its outer end an arm (54, 55) which is directed obliquely forward and outward. On each of these arms (54, 55) is articulated a support (56, 57) fitted with a raking disk (58, 59) which is disposed obliquely relative to the direction of travel (A) in order to move the products from the outside toward the corresponding gathering device (14, 17). These raking disks (58 and 59) are comparable to the aforementioned raking disks (36 and 37). They may be driven in rotation about their axes (60 and 61) by the friction motion with the ground.

These raking disks (58 and 59) may also be replaced by substantially vertical raking drums which are driven in rotation by hydraulic motors.

During work, the machine is attached to a tractor which moves it in the direction of travel (A). The front part of the beam (2) is lowered relative to the tractor until the separation means (35) touch the ground. The arms (7 and 8) are lowered to a substantially horizontal position with the aid of hydraulic rams (11 and 12) such that the wheels (23 to 26 and 31 to 34) run on the ground. When the machine according to the example in FIGS. 1 and 2 moves forward, the raking disks (36 and 37) are driven in rotation about their axes (38 and 39). They then separate the products which they encounter and move them to the right and to the left toward the pick-ups (19 and 20). Thus these raking disks (36 and 37) clear a strip of land whose width is at least equal to the distance between the two pick-ups (19 and 20) so that all the products in the trajectory of the machine reach the zones of action of said pick-ups (19 and 20).

The two raking disks (58 and 59) which are situated at the outer ends of the pick-ups (19 and 20) also rotate about their axes (60 and 61) due to the friction motion with the ground. They then push the products that they encounter toward the middle of the machine, in front of their respective pick-ups (19 and 20) and clear a strip of land either side of the machine.

Said pick-ups (19 and 20) are then driven by the hydraulic motors (21 and 22). They gather the products on the ground and move them upward and rearward onto the conveyor belts (27 and 28). The latter are also driven by their hydraulic motors (29 and 30) so that they move in the same direction indicated by the arrows (F and F'). The second conveyor belt (28) then dispatches its products to the first belt (27) which deposits all the products in the form of a lateral swath on the right-hand side of the machine. It would naturally be possible to deposit the swath on the left-hand side of the machine simply by reversing the direction of movement of the conveyor belts (27 and 28). To form a central swath, it is sufficient to separate the two conveyor belts (27 and 28) and reverse the direction of movement of the first belt (27). In this case, the products fall back onto the ground in the form of a swath passing between the two conveyor belts (27 and 28).

In the example according to FIGS. 3 and 4, the raking drums (46 and 47) are lowered, by means of the beam (2), until their skirts (51) touch the ground. Then, they are driven in the direction of the arrows (B and C) and move the products they encounter toward the outer sides and deposit them in front of the two pick-ups (19 and 20). They thus clear the products situated on the central strip of land so that all the products can be collected by the pick-ups (19 and 20) as has been described above for the example of FIGS. 1 and 2.

The machine according to the invention is used to group into a large-volume swath the forage that was previously over a great width and this can be done without, for the most part, the forage being moved along the bare ground which could make it dirty. This grouping also makes it possible to reduce the number of passes with harvesting machines such as balers and forage harvesters.

For transport, the front of the beam (2) is raised to move the separation devices (35) away from the ground. Then the two arms (7 and 8) with the gathering devices (14 and 17) and the swathing devices (15 and 18) are raised to the vertical position about the axes of articulation (9 and 10).

It is clear that the invention is not limited to the embodiments described above and represented in the appended drawings. Modifications are possible, particularly with respect to the make-up or number of the various elements or by substituting equivalent techniques, without however departing from the field of protection defined by the claims.

The invention claimed is:

1. A machine for grouping products lying on the ground, comprising:
    a main frame carrying a first gathering device including a first pick-up and at least a second gathering device including a second pick-up, the first and second pick-ups configured to move products lying on the ground directly from the ground upward and onto first and second swathing devices, respectively, and having an inner end located toward a middle portion of the machine, the first and second pick-ups situated substantially one beside another with respect to a direction of travel of the machine traveled during grouping; and
    a first swathing device and a second swathing device respectively associated with the first and second pick-ups and located behind the first and second pick-ups with respect to the direction of travel;
    at least one rake configured to clear products lying on the ground from a strip of land between the first and second pick-ups with respect to the direction of travel, and
    an outer rake situated in front of an outer end of each of the gathering devices.

2. A machine as claimed in claim 1, wherein the at least one rake is configured to rotate about an axis substantially horizontal and oblique relative to the direction of travel.

3. A machine as claimed in claim 2, comprising two raking disks placed so as to form a truncated V in which the truncated point is pointing in the direction of travel.

4. A machine as claimed in claim 3, wherein the two raking disks are offset one from the other in the direction of travel.

5. A machine as claimed in claim 2, wherein the at least one raking disk is connected to supports articulated on the main frame.

6. A machine as claimed in claim 2, wherein the at least one raking disk is driven in rotation by friction motion with the ground.

7. A machine as claimed in claim 1, wherein the at least one rake comprises at least one raking drum rotating about a substantially vertical axis.

8. A machine as claimed in claim 7, comprising at least two raking drums placed side by side.

9. A machine as claimed in claim 8, wherein the two raking drums are driven in rotation to turn away from one another at a front.

10. A machine as claimed in claim 9, wherein the two raking drums comprise on their lower part a flexible skirt to gather and move products.

11. A machine as claimed in claim 10, wherein the two raking drums comprise driving elements situated above the flexible skirts.

12. A machine as claimed in claim 1, wherein the outer rakes are disposed obliquely relative to the direction of travel and are configured to move products toward the first and second gathering devices.

13. A machine as claimed in claim 12, wherein the outer rakes are articulated on supports fixed to the first and second gathering devices.

14. A machine as claimed in claim 12, wherein each raking disk comprises a circular support fitted with teeth on its entire periphery.

15. A machine as claimed in claim 1, wherein the gathering devices do not include a cutting blade.

16. A machine as claimed in claim 1, further comprising first and second wheels supporting the first and second gathering devices, respectively, positioned at ends of the first and second gathering devices farthest from the inner ends.

17. A machine as claimed in claim 1, wherein the at least one rake is situated in front of the inner ends of the first and second pick-ups with respect to the direction of travel.

18. A machine as claimed in claim 16, further comprising third and fourth wheels supporting the first and second gathering devices, respectively, the third wheel positioned at the inner end of the first pick-up, and the fourth wheel positioned at the inner end of the second pick-up.

19. A machine as claimed in claim 1, wherein the first and second swathing devices are configured to reverse direction so as to move products toward the middle portion of the machine or in a direction away from the middle portion of the machine.

20. A machine as claimed in claim 1, wherein the outer rakes are raking disks or raking drums.

21. A machine for grouping products lying on the ground, comprising:
a main frame carrying a first gathering device including a first pick-up and at least a second gathering device including a second pick-up, the first and second pick-ups configured to move products lying on the ground directly from the ground upward and onto first and second swathing devices, respectively, and having an inner end located toward a middle portion of the machine, the first and second pick-ups situated substantially one beside another with respect to a direction of travel of the machine traveled during grouping; and
a first swathing device and a second swathing device respectively associated with the first and second pick-ups and located behind the first and second pick-ups with respect to the direction of travel;
a rotatable disk, fitted with teeth, configured to clear products lying on the ground from a strip of land situated between the inner ends of the first and second pick-ups; and
an outer rake situated in front of an outer end of each of the gathering devices.

22. A machine as claimed in claim 21, wherein the rotatable disk rotates about an axis oblique to an axis of rotation of the first pick-up.

23. A machine as claimed in claim 21, wherein the first and second swathing devices are configured to reverse direction so as to move products toward the middle portion of the machine or in a direction away from the middle portion of the machine.

24. A machine as claimed in claim 21, wherein the outer rakes are disposed obliquely relative to the direction of travel and are configured to move products toward the first and second gathering devices.

25. A machine as claimed in claim 24, wherein the outer rakes are articulated on supports fixed to the first and second gathering devices.

26. A machine as claimed in claim 21, wherein the outer rakes are raking disks or raking drums.

27. A machine for grouping products lying on the ground, comprising:
a main frame carrying a first gathering device including a first pick-up and at least a second gathering device including a second pick-up, the first and second pick-ups configured to move products lying on the ground directly from the ground upward and onto first and second swathing devices, respectively, and having an inner end located toward a middle portion of the machine, the first and second pick-ups situated substantially one beside another with respect to a direction of travel of the machine traveled during grouping;
said first swathing device and said second swathing device being respectively located behind the first and second pick-ups with respect to the direction of travel and being adjacent and driven so that they move in the same direction and they deposit all the products in the form of a single lateral swath positioned beside the machine with respect to the direction of travel; and
at least one rake configured to clear products lying on the ground from a strip of land between the first and second pick-ups with respect to the direction of travel.

28. A machine for grouping products lying on the ground, comprising:
a main frame carrying a first gathering device including a first pick-up and at least a second gathering device including a second pick-up, the first and second pick-ups configured to move products lying on the ground directly from the ground upward and onto first and second swathing devices, respectively, and having an inner end located toward a middle portion of the machine, the first and second pick-ups situated substantially one beside another with respect to a direction of travel of the machine traveled during grouping;
said first swathing device and said second swathing device being respectively located behind the first and second pick-ups with respect to the direction of travel and being adjacent and driven so that they move in the same direction and they deposit all the products in the form of a single lateral swath positioned beside the machine with respect to the direction of travel; and
a rotatable disk, fitted with teeth, configured to clear products lying on the ground from a strip of land situated between the inner ends of the first and second pick-ups.

* * * * *